(12) United States Patent
Lee et al.

(10) Patent No.: US 8,749,807 B2
(45) Date of Patent: Jun. 10, 2014

(54) METHOD, SYSTEM, AND TERMINAL FOR PRINTED MATTER SECURITY

(75) Inventors: Sang Jin Lee, Incheon (KR); Seung Tae Paek, Seoul (KR); Il Hoon Choi, Seoul (KR)

(73) Assignee: Somansa Co., Ltd, Seoul (KR)

( * ) Notice: Subject to any disclaimer, the term of this patent is extended or adjusted under 35 U.S.C. 154(b) by 213 days.

(21) Appl. No.: 13/362,812

(22) Filed: Jan. 31, 2012

(65) Prior Publication Data

US 2013/0163030 A1 Jun. 27, 2013

(30) Foreign Application Priority Data

Dec. 26, 2011 (KR) .................. 10-2011-0142526

(51) Int. Cl.
*G06K 15/02* (2006.01)
(52) U.S. Cl.
USPC .................................. 358/1.14; 358/1.15
(58) Field of Classification Search
CPC .................................................. G06F 3/1222
USPC .................................................. 358/1.14, 1.15
See application file for complete search history.

(56) References Cited

U.S. PATENT DOCUMENTS

| 2008/0034403 A1* | 2/2008 | Kakigi | 726/1 |
| 2012/0162681 A1* | 6/2012 | Tomita | 358/1.13 |

* cited by examiner

*Primary Examiner* — Qian Yang
(74) *Attorney, Agent, or Firm* — Sughrue Mion, PLLC

(57) ABSTRACT

Disclosed are a system and a method for printed matter security. A method for printed matter security according to an exemplary embodiment of the present invention includes: receiving policy information, information of a monitoring application program, and pattern information of personal information from a security server; inserting a printing interruption module in the monitoring application program when the monitoring application program corresponding to the information of the application program is executed; storing a content of a printing request by interrupting the printing request of the monitoring application program by the printing interruption module; verifying whether the personal information is included in the content of the printing request, using the pattern information; and performing an information protection function corresponding to the policy information when the personal information is included in the content of the printing request.

6 Claims, 2 Drawing Sheets

METHOD, SYSTEM, AND TERMINAL FOR PRINTED MATTER SECURITY

CROSS-REFERENCE TO RELATED APPLICATIONS

This application claims priority under 35 U.S.C. §119 to Korean Patent Application No. 10-2011-0142526, filed on Dec. 26, 2011, in the Korean Intellectual Property Office, the disclosure of which is incorporated herein by reference in its entirety.

TECHNICAL FIELD

The present invention relates to personal information protection, and more particularly, to a system and a method for printed matter security that can prevent a document including personal information from being leaked.

BACKGROUND

In recent years, 25% of business confidential information leakage is generated by a paper document according to a report of the National Intelligence Service.

In order to prevent personal information leakage due to a printed matter, a system for printed matter security in the related art primarily inserts a watermark to track a printing source into the printed matter and records a printing detail. "The Cyber Information Protection Law" effective as of September 2011 reflects a recording request for a serial number, a printing date, an affiliation and a name of a printing person to a corresponding printed matter when a personal information handler prints personal information on paper.

However, the system for printed matter security in the related art cannot interrupt actual printing of a document including the personal information in real time. That is, the system for printed matter security in the related art can only perform post verification of a stored copy of the printed matter, and cannot interrupt the printed matter including the personal information in real time, such that generation of the printed matter including the personal information cannot be initially prevented in advance.

SUMMARY

An exemplary embodiment of the present invention provides a method for printed matter security by a terminal, including: receiving policy information, information of a monitoring application program, and pattern information of personal information from a security server; inserting a printing interruption module in the monitoring application program when the monitoring application program corresponding to the information of the application program is executed; storing a content of a printing request by interrupting the printing request of the monitoring application program by the printing interruption module; verifying whether the personal information is included in the content of the printing request using the pattern information; and performing an information protection function corresponding to the policy information when the personal information is included in the content of the printing request.

Another exemplary embodiment of the present invention provides a system for printed matter security, including: a security server storing policy information, information of a monitoring application program, and pattern information of personal information; and a terminal verifying the policy information, the information of the monitoring application program, and the pattern information, monitoring whether a printing request is called from the monitoring application program when the monitoring application program corresponding to the information of the monitoring application program is executed, verifying using the pattern information whether personal information is included in a content of the printing request, and performing an information protection function corresponding to the policy information when the personal information is included in the content of the printing request.

Yet another exemplary embodiment of the present invention provides a terminal for printed matter security, including: an agent receiving policy information, information of a monitoring application program, and pattern information of personal information from a security server; an interruption module inserter monitoring whether an application program is executed; and a printing interruption module monitoring whether the monitoring application program calls a printing request and storing a content of the called printing request as a printing interruption module is inserted in the monitoring application program by the interruption module inserter when the monitoring application program corresponding to the information of the monitoring application program is executed, and the agent verifies whether the personal information is included in the content of the printing request using the pattern information and performs an information protection function corresponding to the policy information when the personal information is included.

Other features and aspects will be apparent from the following detailed description, the drawings, and the claims.

DETAILED DESCRIPTION OF EMBODIMENTS

Figure 1:
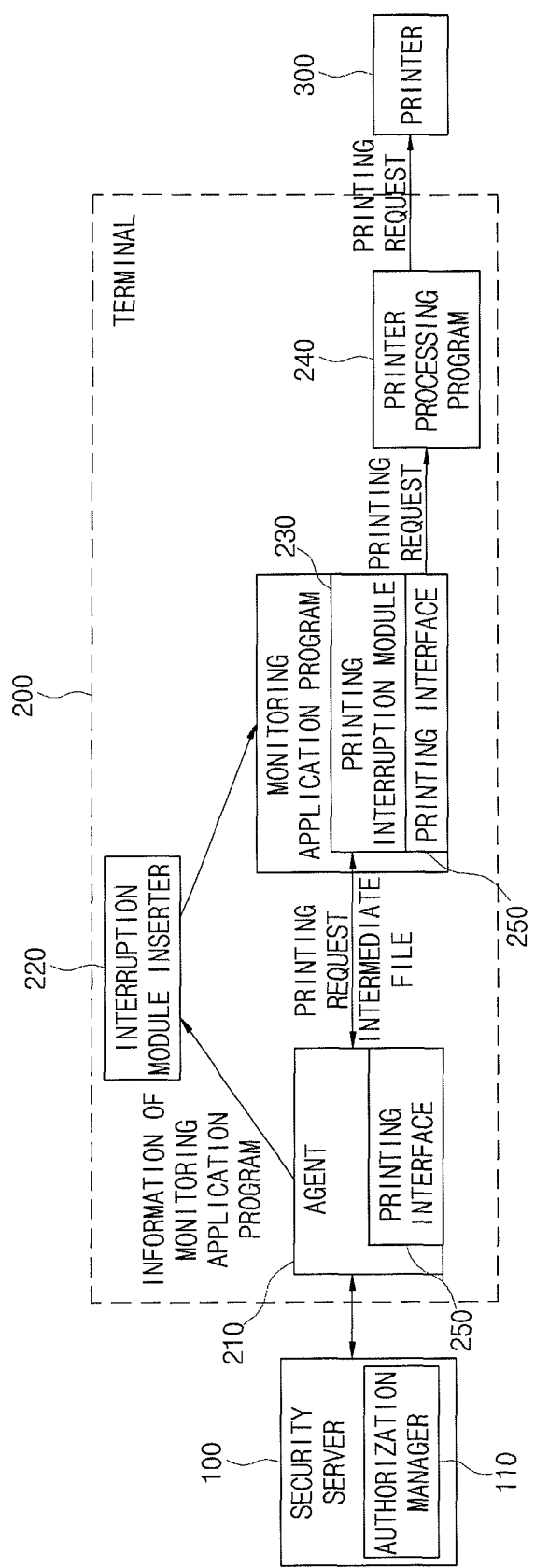
FIG. 1 is a configuration diagram showing a system for printed matter security according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, prior to describing a detailed configuration of the present invention, a print process of an operating system will be described.

When the operating system of a terminal receives a printing request from an application program, the operating system transfers the printing request to a printer through a printing interface and a printer processing program, and as a result, a printed matter is generated by a printer. In this case, at least one application program is installed in the terminal and the terminal includes the printing interface and the printer processing program.

The application program transfers the printing request to the printing interface of the operating system according to a user's control.

The printing interface of the operating system receives the printing request from the application program and transfers the received printing request to the printer processing program of the operating system. Herein, the printing interface of the operating system may be an API related a printing provided by the operating system.

The printer processing program of the operating system transfers the printing request from the printing interface to the printer. Herein, the printer processing program of the operating system may be a spooler program provided by the operating system.

When the printer receives the printing request from at least one terminal, the printer generates the printed matter corresponding thereto.

In the exemplary embodiment of the present invention, an information protecting function depending on a predetermined security policy may be performed with respect to a printed matter including personal information or pattern information of the personal information by monitoring the printing request transferred from the application program providing a printing function to the printing interface of the operating system.

Hereinafter, exemplary embodiments of the present invention will be described in detail with reference to the accompanying drawings. FIG. 1 is a configuration diagram showing a system for printed matter security according to an exemplary embodiment of the present invention.

As shown in FIG. 1, the printed matter security system 10 according to the exemplary embodiment of the present invention includes a terminal 200 including an agent 210, an interruption module inserter 220 and a printing interruption module 230, and an authorization manager 110. The terminal 200 further includes a printing interface 250 of the operating system and a printer processing program 240 of the operating system in order to generate the printed matter through a printer 300.

The authorization manager 110 includes pattern information of personal information, information of a monitoring application program, policy information, and the like.

The pattern information of the personal information is information associated with a format of personal information such as a resident registration number, a driver's license number, a passport number, an account number, a telephone number, a cellular phone number, a card number, an IP number, a residence address, an e-mail address, and the like and may be defined as a regular expression formula and a keyword complex pattern.

The information of the monitoring application program may be information on an application program to monitor whether the printed matter including the personal information is generated among application programs providing the printing function.

The policy information is information on an information protection function to be performed when the printed matter including the personal information is generated from the monitoring application program.

For example, the information protection function may be printing permission after examining prior settlement (prior approval) for the printed matter including the personal information, unconditional interruption, interruption notification as well as unconditional interruption, printing permission and printing detail recording, printing stand-by after a settlement request, and the like.

The authorization manager 110 includes in a database information required to examine the prior settlement of the printing request (alternatively, the printed matter to be generated) or not, e.g., output target document information which is approved in advance, information on a printing person of the printed matter, information on an approver who approves generation of the printed matter, and the like when the information protection function is the printing permission after examining the prior settlement or not.

Meanwhile, the authorization manager 110 may be included in a security server 100 and may be connected with the terminal 200 through a local table, a networking table, a wireless interface, and the like. Of course, the authorization manager 110 may also be included in the terminal 200.

The agent 210 periodically receives the policy information and the information of the monitoring application program from the authorization manager 110 and stores the received information in a hard disk of the terminal 200 as a file, and transfers the information of the monitoring application program to the interruption module inserter 220.

The interruption module inserter 220 receives the information of the monitoring application program from the agent 210 to periodically monitor whether the operating system executes a new application program included in the information of the monitoring application program.

Specifically, the interruption module inserter 220 verifies whether the new application program is an application program corresponding to the information of the monitoring application program when it is verified that the new application program is executed and inserts the printing interruption module 230 when the new application program is the monitoring application program.

If the printing interruption module 230 is inserted into the monitoring application program by the interruption module inserter 220 to operate as a part of the monitoring application program, the printing interruption module 230 monitors whether the printing request including at least one of the pattern information of the personal information and the personal information is transferred to the printing interface of the operating system in the monitoring application program and performs the information protection function corresponding to the policy information interrupting the printing request when the printing request including the at least one is transferred.

Specifically, the printing interruption module 230 interrupts the printing request when a printing start request is transferred to the printing interface of the operating system from the application program and stores the interrupted printing request in an intermediate file.

The printing interruption module 230 generates a new intermediate file when a new page starts, stores a content of a called printing request in the intermediate file, and ends storing of the intermediate file when a page end request is verified. In this case, the printing interruption module 230 generates an intermediate file for each page and stores the content of the printing request of each page in the intermediate file for each page when the content of the printing request consists of several pages.

In this case, the printing request includes a printing start request, a printing end request, a new page start request, a page end request, a figure drawing request, a letter printing request, a painting request, a file drawing request, a file deletion request, and the like. Specifically, the printing request starts with the printing start request and ends with the printing end request and at least one new page start request and at least one page end request are included between the printing start request and the printing end request. In addition, a content for generating the printed matter such as the figure drawing request, the letter printing request, the painting request, the file drawing request, the file deletion request, or the like is included between the new page start request and the page end request.

Meanwhile, the printing interruption module 230 may add information such as a serial number, a printing date, an affiliation and a name of the printing person, and the like according to the policy information when the storing of the intermediate file ends.

The printing interruption module 230 transfers a list of the intermediate files stored up to now to the agent 210 when the printing end request is called.

Meanwhile, when the agent 210 receives the list of the intermediate files, the agent 210 extracts texts from the intermediate file corresponding thereto and verifies whether the personal information is included in the extracted text using the pattern information of the personal information. In this case, the agent 210 infers and extracts the text part applying an optical character recognition (OCR) technique to a part corresponding to the file drawing or figure drawing request as well as a part corresponding to the letter extraction request from the intermediate file.

The agent 210 transfers a normal printing request to the printing interruption module 230 when the personal information is not included in the intermediate file. And the agent 210 performs the information protection function corresponding to the policy information when the personal information is included in the intermediate file.

Hereinafter, detailed processing in a first case in which the personal information is not included in the intermediate file and a second case in which the personal information is included in the intermediate file, by the agent 210, the printing interruption module 230, the printing interface of the operating system, the printer processing program of the operating system, or the printer will be described.

<<Processing in First Case in which Personal Information is not Included in the Intermediate File>>

The agent 210 transfers the normal printing request to the printing interruption module 230 when the personal information is not included in the intermediate file.

The printing interruption module 230 transfers the intermediate file to the printing interface of the operating system.

The printing interface 250 of the operating system transfers the printing request to the printer processing program 240 of the operating system.

The printer processing program 240 of the operating system transfers the printing request to the printer 300 to generate the printed matter through the printer 300.

In this case, the agent 210 transfers the information of the printed matter such as the printing date, the printing person, the intermediate file, and the like to the authorization manager 110 and stores the transferred information in the database through the authorization manager 110 to use the information of the printed matter to determine and update the pattern information of additional personal information.

<<Processing in Second Case in which Personal Information is Included in the Intermediate File>>

When the personal information is included in the intermediate file, the agent 210 verifies whether there is the prior settlement information on a printing content through the authorization manager 110, performs processing similarly as the first case in which the personal information is not included in the intermediate file when there is the prior settlement information. While, the agent 210 performs the information protection function corresponding to the policy information there is no prior settlement information. Hereinafter, the information protection function corresponding to the information policy when the personal information is included in the intermediate file will be described in detail.

(1) In Case of Unconditional Interruption or Interruption Notification as Well as Unconditional Interruption When the information protection function is the unconditional interruption or not only unconditional interruption but also interruption notification to a terminal user, the agent 210 notifies a printing failure request to the printing interruption module 230 and ends printing. In this case, no information is transferred to the printing interface of the operating system.

However, when the information protection function is the interruption notification as well as interruption, the agent 210 notifies information on the interruption or not and an interruption reason through a pop-up message window.

(2) In Case of Printing Permission and Printing Detail Recording

When the information protection function is the printing permission and printing detail recording, the agent 210 generates the printed matter corresponding to the intermediate file performing the same processing as the case in which the personal information is not included in the intermediate file.

In this case, the agent 210 transmits the printing person information, the printing date, a text file extracted from the intermediate file, or the intermediate file to the authorization manager 110 to store the printing person information, the printing date, the text file extracted from the intermediate file, or the intermediate file in the database through the authorization manager 110.

(3) In Case of Printing Stand-By after Settlement Request

When the information protection function is the printing stand-by after the settlement request, the agent 210 performs two following processes according to a synchronous post-settlement request or an asynchronous post-settlement request.

In Case of Synchronous Post-Settlement Request

In case of the synchronous post-settlement request, the agent 210 generates a settlement request window and receives a settlement request for printing printed matter from user through the settlement request window. In this case, the settlement request window may receive information on a printing requester (user information), information on a printing target document, details of detected personal information, the printing reason, or the like.

In Case of Asynchronous Post-Settlement Request

When the information protection function is the asynchronous post-settlement request, the agent 210 notifies to the printing interruption module 230 that the information protection function is the asynchronous post-settlement request and the printing interruption module 230 notifies to the monitoring application program that the information protection function is the asynchronous post-settlement request to. In this case, the application program may end without verifying a result corresponding to the printing request.

The agent 210 generates the settlement request window and receives a request for settlement of the printing request of the printed matter by a user through the settlement request window. In this case, the settlement request may include the information on the printing requester (user information), the information on the printing target document, the details of the detected personal information, the printing reason, or the like, and may be performed through an e-mail or a settlement system.

Meanwhile, when a settlement approver approves or denies the settlement request through the e-mail or the settlement system, a settlement result (approval or denial) is transferred to the agent 210 through the authorization manager 110.

When the agent 210 verifies the approval of the printing request from the settlement result, the agent 210 attempts printing through the printing interface 250 of the operating system using an intermediate file. As described above, in case of the asynchronous post-settlement request, since the agent 210 prints the printed matter using the intermediate file including the content of the printing request, the application program requesting the printing may be closed when the printed matter is printed.

The agent 210 ends the corresponding printing request without attempting the printing when denial of the printing request is verified from the settlement result.

Figure 2:
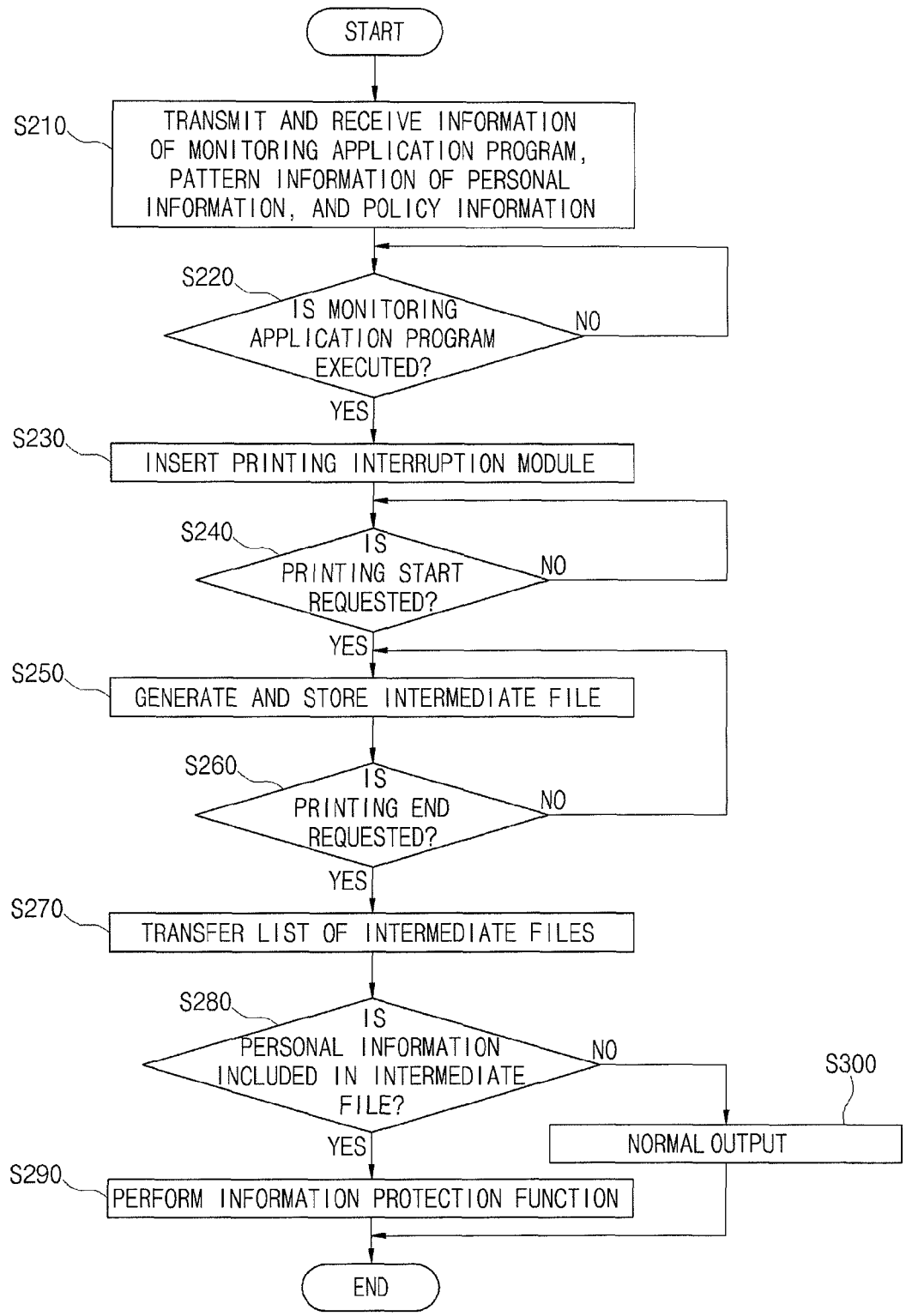
FIG. 2 is a flowchart showing a method for printed matter security according to an exemplary embodiment of the present invention.

Hereinafter, a method for printed matter security according to an exemplary embodiment of the present invention will be described with reference to FIG. 2. FIG. 2 is a flowchart showing a method for printed matter security according to an exemplary embodiment of the present invention. In this case, the terminal 200 includes the agent 210, the interruption module inserter 220, and the printing interruption module 230.

Referring to FIG. 2, the agent 210 receives the information of the monitoring application program, the policy information, and the pattern information of the personal information from the authorization manager 110, stores the information in the hard disk as the file, and transfers the information of the monitoring application program to the interruption module inserter 220 (S210).

The interruption module inserter 220 verifies whether the monitoring application program corresponding to the information of the monitoring application program is executed (S220).

The interruption module inserter 220 inserts the printing interruption module 230 when the monitoring application program is executed (S230).

The printing interruption module 230 verifies whether the printing start request is transferred to the printing interface of the operating system in the application program (S240).

The printing interruption module 230 generates the intermediate file when the printing start request is transferred and thereafter, interrupts the called printing request and stores the interrupted printing request in the intermediate file (S250). In this case, the printing interruption module 230 generates a new intermediate file when a new page starts, stores the content of the printing request called before a page end request in the corresponding intermediate file, and ends storing of the corresponding intermediate file when the page end request is verified. Herein, the printing interruption module 230 may add the information including the serial number, the printing date, the affiliation and name of the printing person, and the like according to the policy information when the storing of the intermediate file ends. Further, the printing interruption module 230 generates the intermediate file for each page and stores the printing content of each page in the intermediate file for each page when the content to be printed consists of several pages.

When the printing end request is called (yes of S260), the printing interruption module 230 transfers a list of the intermediate files stored up to now to the agent 210 (S270).

The agent 210 extracts texts from the intermediate file corresponding to the list of the intermediate files and verifies whether the personal information is included in the extracted text using the pattern information of the personal information (S280).

In this case, the agent 210 infers and extracts the text part applying an optical character recognition (OCR) technique to a part corresponding to the file drawing or figure drawing request as well as a part corresponding to the letter extraction request from the intermediate file.

When the personal information is included in the intermediate file, the agent 210 performs the information protection function corresponding to the policy information as described above (S290).

The agent 210 transfers the normal printing request to the printing interruption module 230 when the personal information is not included in the intermediate file (S300). In this case, the printing interruption module 230 transfers the intermediate file to the printing interface and generates the printed matter corresponding to the printing request through the printing interface, the printer processing program, and the printer.

According to exemplary embodiments of the present invention, when a printing request is verified in real time and corresponds to pattern information of personal information in a content of a text of a printed matter, the personal information leaks through the printed matter can be initially prevented as a predetermined information protection function is performed with respect to the corresponding printing request.

Further, since the printing request is interrupted and stored as the intermediate file, the information protection function for the printed matter including the personal information and the settlement processing for the printed matter can be performed asynchronously with each other, and as a result, the corresponding printed matter can be printed without re-executing the application program even though an manager's approval of the corresponding printed matter is received after an application program requesting printing ends.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal for printed matter security, comprising:
a processor;
a memory for storing a monitoring application program;
an agent executed by the processor, receiving policy information, information of the monitoring application program, and pattern information of personal information from a security server;
an interruption module inserter executed by the processor, monitoring whether an application program is executed; and
a printing interruption module executed by the processor, monitoring whether the monitoring application program calls a printing request and storing a content of the called printing request as the printing interruption module is inserted in the monitoring application program by the interruption module inserter when the monitoring application program corresponding to the information of the monitoring application program is executed,
wherein the agent verifies whether the personal information is included in the content of the printing request using the pattern information and performs an information protection function corresponding to the policy information when the personal information is included, wherein the printing request includes a printing start request, a printing end request, a new page start request, a page end request, and a request associated with a printing content, and the printing interruption module interrupts the subsequently called another printing request when the printing start request is called, generates one intermediate file when the new page start request is called and stores a request associated with the printing content in the one intermediate file, generates an intermediate file for each page ending storing of the one intermediate file when the page end request is called, and transfers a list of all the stored intermediate files to the agent when the printing end request is called.

2. The terminal of claim 1, wherein the agent extracts texts from the intermediate file corresponding to the list of the intermediate file and judges that the personal information is included in the intermediate file when a pattern of personal information corresponding to the pattern information is included in the extracted text.

3. The terminal of claim 1, wherein when the information protection function is printing permission after a prior settlement (prior approval), the agent verifies the prior settlement for the printing request or not through the security server and permits generation of a printed matter corresponding to the printing request when the printing request is settled in advance.

4. The terminal of claim 1, wherein when the information protection function is printing permission and printing detail recording, the agent permits a generation of the printed matter corresponding to the printing request, and transfers an intermediate file including information of a printing person of the printed matter, a printing date of the printed matter, and a content of the printed matter to the security server and stores the transferred intermediate file in a database of the security server.

5. The terminal of claim 1, wherein when the information protection function is printing stand-by after a settlement request, the agent makes a settlement request for the printing request, generates the printed matter corresponding to the printing request when the settlement request is approved, and does not generate the printed matter when the settlement request is not approved.

6. The terminal of claim 5, wherein when the settlement request is asynchronous, the agent notifies the settlement request to the monitoring application program through the printing interruption module after transferring the settlement request to a predetermined approver and generates the printed matter using the stored content of the printing request regardless of execution of the monitoring application program or not when the settlement request is approved.

* * * * *